(12) United States Patent
Cheng et al.

(10) Patent No.: US 12,260,538 B2
(45) Date of Patent: Mar. 25, 2025

(54) DEFECT DETECTION IN IMAGE SPACE

(71) Applicant: AGENCY FOR SCIENCE, TECHNOLOGY AND RESEARCH, Singapore (SG)

(72) Inventors: Jierong Cheng, Singapore (SG); Ying Sun, Singapore (SG); Wei Xiong, Singapore (SG); Wenyu Chen, Singapore (SG); Yusha Li, Singapore (SG); Ying Quan, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 289 days.

(21) Appl. No.: 17/782,015

(22) PCT Filed: Dec. 8, 2020

(86) PCT No.: PCT/SG2020/050727
§ 371 (c)(1),
(2) Date: Jun. 2, 2022

(87) PCT Pub. No.: WO2021/118463
PCT Pub. Date: Jun. 17, 2021

(65) Prior Publication Data
US 2023/0014823 A1    Jan. 19, 2023

(30) Foreign Application Priority Data

Dec. 9, 2019   (SG) .......................... 10201911839Y

(51) Int. Cl.
*G06T 7/11*  (2017.01)
*G06T 5/20*  (2006.01)
(Continued)

(52) U.S. Cl.
CPC .............. *G06T 7/0004* (2013.01); *G06T 5/20* (2013.01); *G06T 5/70* (2024.01); *G06T 7/0002* (2013.01);
(Continued)

(58) Field of Classification Search
CPC ....... G06T 7/0004; G06T 7/0002; G06T 7/11; G06T 7/149; G06T 5/20; G06T 5/70;
(Continued)

(56) References Cited

U.S. PATENT DOCUMENTS

2020/0175352 A1*  6/2020  Cha .......................... G06N 3/04

FOREIGN PATENT DOCUMENTS

CN           109407149 A  *  3/2019  ............. G01V 1/306

OTHER PUBLICATIONS

Mei et al, A Conditional Wasserstein Generative Adversarial Network for Pixel-level Crack Detection using Video Extracted Images, 2019, arXiv:1907.06014, pp. 1-12. (Year: 2019).*

(Continued)

*Primary Examiner* — Kathleen M Broughton
(74) *Attorney, Agent, or Firm* — Botos Churchill IP Law LLP

(57) ABSTRACT

This invention relates to a method for training a neural network, comprising detecting a hole in each training image of a plurality of training images; transforming each training image into a transformed image, to suppress non-crack information in the training image; and training a neural network using the transformed images, to detect cracks in images (i.e. in objects in images).

17 Claims, 9 Drawing Sheets

(51) Int. Cl.
| | |
|---|---|
| *G06T 5/70* | (2024.01) |
| *G06T 7/00* | (2017.01) |
| *G06T 7/149* | (2017.01) |
| *G06V 10/34* | (2022.01) |
| *G06V 10/82* | (2022.01) |

(52) U.S. Cl.
CPC .............. *G06T 7/11* (2017.01); *G06T 7/149* (2017.01); *G06V 10/34* (2022.01); *G06V 10/82* (2022.01); *G06T 2207/20021* (2013.01); *G06T 2207/20076* (2013.01); *G06T 2207/20081* (2013.01); *G06T 2207/20084* (2013.01)

(58) Field of Classification Search
CPC . G06T 2207/20021; G06T 2207/20076; G06T 2207/20081; G06T 2207/20084; G06T 2207/30164; G06V 10/34; G06V 10/82; G06F 18/2413; G06F 18/28; G06N 3/045; G06N 3/047; G06N 3/088
See application file for complete search history.

(56) References Cited

OTHER PUBLICATIONS

Fang et al, Towards Real-Time Crack Detection Using a Deep Neural Network with a Bayesian Fusion Algorithm, 2019, IEEE International Conference on Image Processing, pp. 1-6. (Year: 2019).*

Lee et al, Learning to Detect Cracks on Damaged Concrete Surfaces Using Two-Branched Convolutional Neural Network, 2019, Sensors, pp. 1-17. (Year: 2019).*

Song et al, Automatic Pavement Crack Detection and Classification Using Multiscale Feature Attention Network, 2019, Digital Object Identifier, pp. 1-12. (Year: 2019).*

Li et al, Perceptual Generative Adversarial Networks for Small Object Detection, 2017, arXiv: 1706.05274v2, pp. 1-9. (Year: 2017).*

Hoang et al, Metaheuristic Optimized Edge Detection for Recognition of Concrete Wall Cracks: A Comparative Study on the Performances of Roberts, Prewitt, Canny, and Sobel Algorithms, 2018, Advances in Civil Engineering, vol. 2018, pp. 1-16. (Year: 2018).*

Sungatullina et al, Image Manipulation with Perceptual Discriminators, 2018, arXiv: 1809.01396v1, pp. 1-18. (Year: 2018).*

Attard et al, Automatic Crack Detection using Mask R-CNN, 2019, 11th International Symposium on Image and Signal Processing and Analysis, pp. 1-7. (Year: 2019).*

Purohit et al, Learning Based Single Image Blur Detection and Segmentation, 2018, 25th IEEE international Conference on Image Processing, pp. 1-6. (Year: 2018).*

The International Search Report and The Written Opinion of The International Searching Authority for International Application No. PCT/SG2020/050727, Date of Mailing: Feb. 26, 2021.

Jeelani H., et al., "Content-Aware Enhancement of Images with Filamentous Structures", IEEE Transactions of Image Processing, 2019, vol. 28, No. 7, pp. 3451-3461.

Lee J. et al., "Learning to Detect Cracks on Damaged Concrete Surfaces Using Two-Branched Convolutional Neural Network", Sensors, 2019, vol. 19, No. 4796, pp. 1-18.

Li S., et al., "Image-Based Concrete Crack Detection Using Convolutional Neural Network and Exhaustive Search Technique", Advances in Civil Engineering, 2019, vol. 2019, No. 6520620, pp. 1-12.

Some L., "Automatic Image-based Road Crack Detection Methods", Thesis, Stockholm, Sweden, 2016.

Xie X., et al., "The Multichannel Integration Active Contour Framework for Crack Detection", International Journal of Advanced Robotic Systems, 2019, pp. 1-13.

Zhang K., et al., "CrackGAN: Pavement Crack Detection Using Partially Accurate Ground Truths Based on Generative Adversarial Learning", 2019, pp. 1-14.

Nechval , et al., "Nechval K. N. et al., Prediction of Fatigue Crack Growth Process via Artificial Neural Network Technique", Computing, 2006, vol. 5, Issue 3, pp. 1-12.

\* cited by examiner

DEFECT DETECTION IN IMAGE SPACE

CROSS-REFERENCE TO RELATED APPLICATIONS

The present application is a national phase entry under 35 U.S.C. § 371 of International Application No. PCT/SG2020/050727, Dec. 8, 2020, published as International Publication No. WO 2021/118463 A1, which claims the benefit of the filing date of Singapore Patent Application No. 10201911839Y, filed Dec. 9, 2019, the disclosures of which are hereby incorporated by reference.

TECHNICAL FIELD

This invention relates to methods for detecting defects in transformed image space. In particular, the present invention relates to training a neural network to detect cracks in images (i.e. in objects shown in images), and use of such a neural network to detect cracks.

BACKGROUND

Crack detection is one of the most important considerations in blade structure maintenance. Crack detection directly reflects how safe and durable the blade structure is. Conventional human-based crack detection methods rely on trained inspectors to find cracks on the surface of a blade based on their expertise and years of experience. They assess the blade structure through analysing the position and width of cracks. Although human-based crack detection methods are an effective way to detect cracks, the detection results are subjective and vary from one to another because inspectors only make evaluations based on the current condition according to existing guidelines and their experience.

To overcome the drawbacks of human-based crack detection methods, many image processing techniques (IPTs) have been developed to detect blade cracks. The IPTs can not only recognize cracks from images but also measure the width and orientation of the recognized cracks. The simplest way to detect cracks from images is using the structural features, including histograms and thresholding. To further improve performance, some methods apply general global transforms and edge detection detectors, such as fast Haar transform (FHT), fast Fourier transform (FFT), Sobel, and Canny edge detectors. Although the IPTs are effective in detecting some specific images, their robustness is poor because the crack images taken from a blade structure may be affected by factors such as light, shadows, and rusty and rough surfaces in real-world situations. In most of the contexts, the cracks appear as thin, irregular long-narrow objects, and often are buried into complex, textured background with high diversity. This makes crack detection very challenging.

To improve the performance of image-based crack inspection methods, researchers turn to deep learning algorithms. Deep-learning methods perform crack detection following two steps: feature extraction and pattern classification. However, using deep learning for highly accurate crack localization is non-trivial. First, region-based object detection cannot locate cracks accurately, and it is also very inefficient. Second, networks face severe data imbalance issues (e.g. lack of sufficient, labelled data) inherent in crack-like object detection that can cause training to fail. Third, deep learning-based methods are also domain sensitive, which can result in poor model generalization ability. Fourth, deep learning is a data driven method that relies on a large amount of manually labelled ground truths (GTs) for the training which is labour-intensive and even infeasible, especially for annotating pixel-level GTs.

It is generally desirable to overcome or ameliorate one or more of the above described difficulties, or to at least provide a suitable alternative.

SUMMARY OF THE INVENTION

Presently disclosed in is a method for training a neural network, comprising:
transforming each training image of a plurality of training images by, for each training image:
  detecting a hole in the training image; and
  transforming the training image into a transformed image, to suppress non-crack information; and
training a neural network using the transformed images, to detect cracks in images.

The method may further comprise:
receiving at least one further image; and
applying the trained neural network to the at least one further image, to detect cracks in the at least one further image.

Transforming each training image may comprise, for each training image, applying a set of filters, the set of filters being designed to enhance image features based on a shape of each said feature, segmenting the training image to produce a segmentation mask, and combining the segmentation mask with responses from the set of filters.

Segmenting may comprise performing active contour-based segmentation of the hole in the image. Applying a set of filters comprises applying Jerman's 2D vesselness filter and a multi-scale line filter to the image to enhance crack information in the training image.

Transforming each training image may further comprise identifying, based on the segmentation mask and the responses from the set of filters, a surrounding region.

Transforming each training image may further comprise applying a filter to the surrounding region to enhance crack features to produce a filter response, applying Gaussian blur to the surrounding region to produce a Gaussian blurred segmentation mask of the hole, and attributing to the transformed image a maximum of the filter response and Gaussian blurred segmentation mask. Transforming each training image may comprise converting each training image into a near-binary image.

Transforming each training image into a transformed image, to suppress non-crack information in the training image, may comprise detecting crack features by reference to the hole detected in the respective training image. A plurality of the training images may form a series of temporally spaced images of a common object, and detecting crack features by reference to the hole detected in the respective training image may then comprise comparing crack features detected in a first image in the series with crack features detected in a second image in the series to determine crack progression. Each image may comprise an object, and the method may then further comprising:
receiving a further image of an object;
applying the trained neural network to the further image, to detect crack features in the further image; and
comparing the crack features in the further image to crack features in a temporally previous image of the object of the further image to determine crack progression.

Transforming each training image into a transformed image, to suppress non-crack information in the training image, may comprise disregarding crack features that are not associated with a hole detected in the respective training image.

Said method may further comprise producing one or more further training images by combining a hole segmentation mask with a crack segmentation mask.

Training the neural network may comprise training a conditional generative adversarial network (cGAN) using the transformed images. Said cGAN may comprise an adversarial discriminator for distinguishing between real ground-truth (GT) images and generated images, and a generator for generating the generated images. The ground-truth images may be associated with the training images. Training the neural network may also comprise incorporating a perceptual discriminator into the cGAN. The perceptual discriminator is used to discriminate crack/non-crack patches.

The perceptual discriminator may output an estimated probability p of the training image containing a crack, wherein a perceptual discrimination loss is defined as a loss of binary classification according to:

$$L_{dis\_p}(x) = -\log p_g(x) = -g \log p(x) - (1-g)\log(1-p(x))$$

where g indicates a ground-truth class.

Parameters of the generator are obtained by optimizing a loss function being a sum of the adversarial loss and a perceptual loss produced by the adversarial discriminator and perceptual discriminator, according to:

$$L_G(G) = L_a(G) + L_{dis\_p}(G)$$

where $$L_a(G) = -\log D_a(y, G(y,z)).$$

Also disclosed herein is a system for training a neural network, comprising:
memory; and
at least one processor, the memory storing instructions that, when executed by the at least one processor, cause the at least one processor to:
transform each training image of a plurality of training images by, for each training image:
detecting a hole in the training image; and
transforming the training image into a transformed image, to suppress non-crack information; and
train a neural network using the transformed images, to detect cracks in images.

The at least one processor may be configured to perform the method described above. The at least one processor may transform each training image into a transformed image, to suppress non-crack information in the training image, by detecting crack features by reference to the hole detected in the respective training image.

The at least one processor may be further configured to:
receive at least one further image; and
apply the trained neural network to the at least one further image, to detect cracks in the at least one further image, wherein transforming each training image into a transformed image, to suppress non-crack information in the training image, comprises detecting crack features by reference to the hole detected in the respective training image; and/or
wherein a plurality of the training images form a series of temporally spaced images of a common object, and the at least one processor is configured to detect crack features by reference to the hole detected in the respective training image by comparing crack features detected in a first image in the series with crack features detected in a second image in the series to determine progression of a crack, and wherein each image comprises an object, the at least one processor being further configured to:
receive a further image of an object;
apply the trained neural network to the further image, to detect crack features in the further image; and
compare the crack features in the further image to crack features in a temporally previous image of the object of the further image to determine crack progression.

The at least one processor may transform each training image by, for each training image, applying a set of filters, the set of filters being designed to enhance image features based on a shape of each said feature, segmenting the training image to produce a segmentation mask, and combining the segmentation mask with responses from the set of filters. The at least one processor may segment the respective image by performing active contour-based segmentation of the hole in the image. The at least one processor may apply a set of filters by applying Jerman's 2D vesselness filter and a multi-scale line filter to the image to enhance crack information in the training image. The at least one processor may transform each training image by further identifying, based on the segmentation mask and the responses from the set of filters, a surrounding region. The at least one processor may transform each training image by further applying a filter to the surrounding region to enhance crack features to produce a filter response, applying Gaussian blur to the surrounding region to produce a Gaussian blurred segmentation mask of the hole, and attributing to the transformed image a maximum of the filter response and Gaussian blurred segmentation mask. The at least one processor may transform each training image by converting each training image into a near-binary image.

Advantageously, it has been found that cracks often start around holes and, by detecting holes and then identifying cracks by reference to the holes (e.g. stemming from a hole, radiating away from a hole, concentric with a hole etc), there is a greater likelihood of positively identifying cracks rather than dark features that have similar appearance to cracks—e.g. dirt.

BRIEF DESCRIPTION OF THE DRAWINGS

Some embodiments will now be described, by way of non-limiting example only, with reference to the accompanying drawings in which.

DETAILED DESCRIPTION

Figure 1:
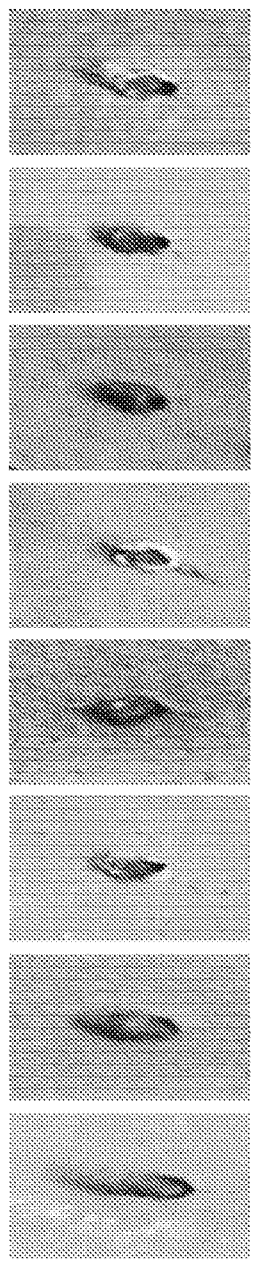
FIG. 1 is a diagram showing example image patches containing cracks.

Disclosed herein is a system for training a neural network to detect holes or cracks in images. The proposed system is applicable in maintenance, repair and overhaul (MRO) industries that require visual inspection of small surface defects. Such a system can be used in the detection of small defects such as cracks, scratches, and dents, in images of a structure or article, and classification of such small objects in images/videos of the structure or article. As shown in FIG. 1, some of the example cracks associated with turbine blade cooling holes are ambiguous even to human experts. Embodiments of the methods disclosed herein are able to address the challenges of detecting such holes or cracks on high pressure turbine blades of, for example, aircraft engines and in other aerospace industry applications (e.g. fuselage monitoring).

Embodiments also relate to methods of training a neural network to detect a hole or cracks in images and using the thus trained neural network for such detection. Embodiments of the proposed detecting system consider two levels of hierarchy to detect holes in images, the first level being image transformation to suppress non-crack information, and the second level being training a conditional generative adversarial network (cGAN) using the transformed images. The proposed detecting methods at the first level allow each original image patch to be converted to a near-binary image patch, providing the flexibility to incorporate prior knowledge about the unique characteristics of hole cracks, and directing the deep learning model trained at the second level to focus on identifying shape information.

To be specific, at the first level, the original images are transformed into near-binary image patches by image segmentation and filtering. In each image patch, the generation of image patches after hole detection combines a set of filter responses to highlight the hole and its crack. At the second level, the cGAN is trained using the transformed images to further enhance the weak appearance of such cracks and hence improve the detection rate. In some embodiments, the second level can be further refined by combining losses from multiple discriminator networks to rapidly converge the cGAN towards an optimal solution.

Figure 2:
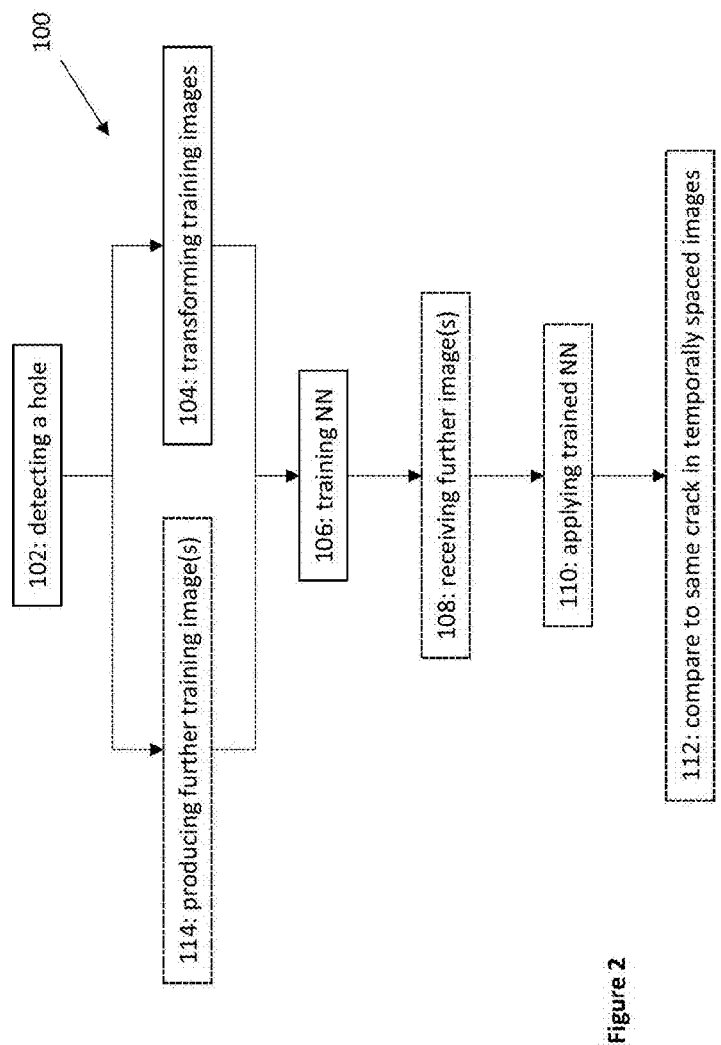
FIG. 2 is a method for training (and applying) a neural network in accordance with present teachings.

Such a method 100 is shown in FIG. 2. The method 100 broadly includes:
transforming each training image from a plurality of training images by:
Step 102: detecting a hole in each training image of a plurality of training images; and
Step 104: transforming each training image into a transformed image, to suppress non-crack information in the training image; and
Step 106: training a neural network using the transformed images, to detect cracks in further images.

Once the neural network has been trained, per Step 106, the trained neural network will then be used to identify cracks (e.g. locate crack features in objects in further images that did not form part of the trained corpus of images). To that end, the method 100 will further include:
Step 108: receiving at least one further image (i.e. a new image that did not appear in the training images); and
Step 110: applying the neural network trained at Step 106 to the further image(s), to detect cracks in the further image(s).

A "hole" in an image is something that looks like a physical hole—e.g. an intentional hole such as a rivet hole or bolt hole, or unintentional hole such as one formed by corrosion, weakening or impact. A hole is defined by particular image features. Step 102 may therefore involve processing the images to identify hole features (and therefore holes) using one or more of various known machine learning approaches. In the present context, step 102 involves employing local standard deviation filtering based on pixel lightness or contrast. The local standard deviation is calculated over a predetermined window size. Where more than one window size is used, the results may be summed or otherwise combined (e.g. through weighted summation). For example, filtering may be performed based on the local standard deviation of the lightness of the image using two window sizes: e.g. 5 and 9 pixels. A combined response of local standard deviation is then obtained by summing the responses for the two window sizes.

Step 102 may also involve thresholding the response (e.g. determining whether the combined filter response exceeds a predetermined threshold), to generate an initial mask for holes. Step 102 may further involve analysing shape properties of each candidate hole and refining the initial mask (thereby producing a refined mask) for the holes based on the shape properties. Such analysis may include determining whether there is a complete boundary for the hole—e.g. for a rivet or bolt hole the boundary of the hole will form a closed circle. Relevant shape image feature analysis methods will be understood by the skilled person in view of present teachings.

Holes may be detected per Step 102 by applying or producing a segmentation mask that distinguishes between hole pixels and non-hole pixels. Segmentation may include performing active contour-based segmentation to detect the hole in the image. Moreover, a set of filters may be applied, the set of filters being designed to enhance image features based on a shape of each relevant feature. As discussed below, applying a set of filters may include, for example, applying Jerman's 2D vesselness filter and a multi-scale line filter to the image to enhance crack information in the training image.

The training images may then be segmented to produce a segmentation mask, and the segmentation mask combined with responses from the set of filters. Based on the segmentation mask and the responses from the set of filters, a surrounding region can be identified that surrounds the hole. A filter can then be applied to the surrounding region to enhance crack features. Therefore, cracks are identified by reference to holes.

Notably, one capability of embodiments of the present method can be that the progression of a crack can be monitored over time. To that end, per Step 112, a number (i.e. two or more) of the training images may form a series of temporally spaced images of a common object—i.e. the same object, such as a particular region of a turbine blade or a particular hole, is captured in each of the images. Crack features are then detected by reference to the hole detected in the object in each of the training images—this can involve comparing crack features detected in a first image in the series with crack features detected in a second image in the series to determine crack progression. If there is no progression —elongation or enlargement—of the crack then the structure of the object may still be acceptable. If there is progression of the crack, the structure may need repair. Note: in this sense, the absence of crack features from an earlier image, and the presence of crack features in a later image of the same object, is considered to be a circumstance of comparing crack features and thus of detecting crack progression. After training, the same process can be used on new or further images.

Conversely to identifying cracks by reference to holes, crack features may also be disregarded if they are not associated with a hole.

Figure 3:
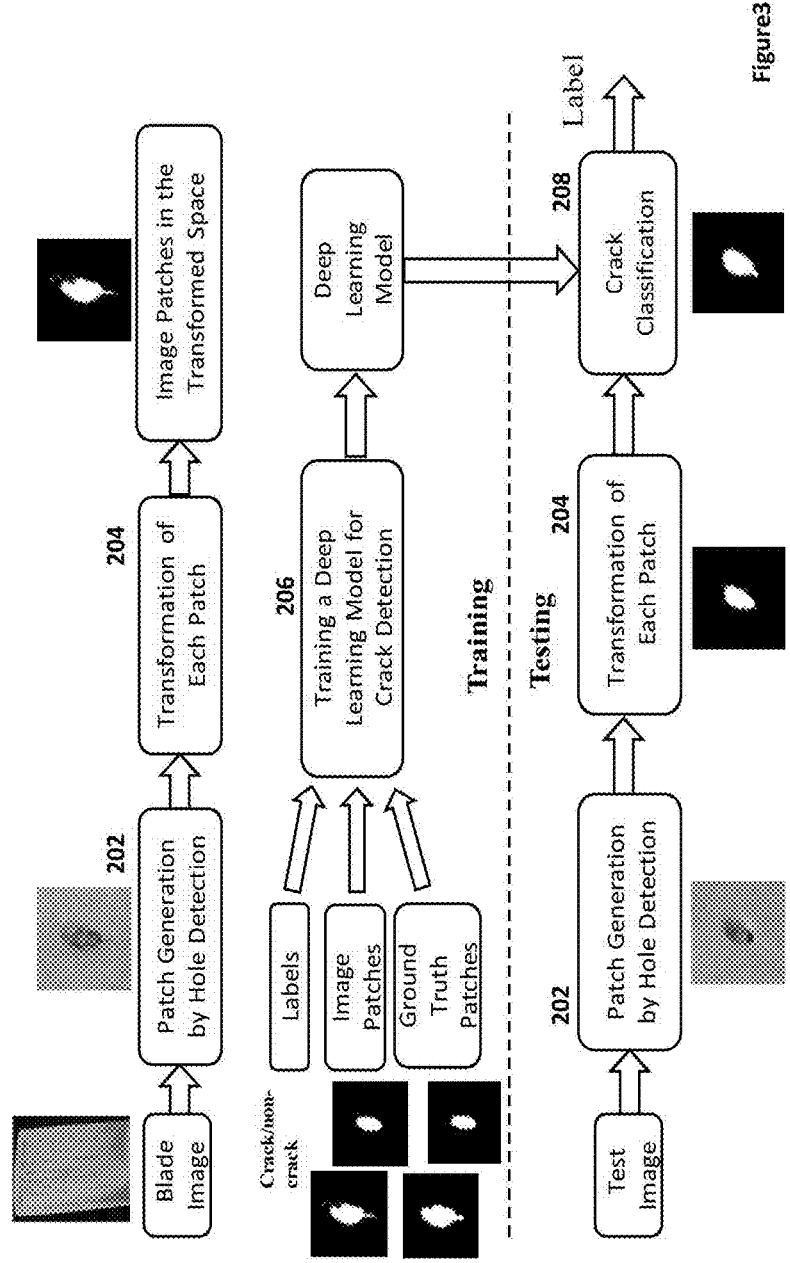
FIG. 3 is a flow diagram showing a method used for crack detection.

Step of the method 100 are more fully explored by reference to method 200 of FIG. 3. Method 200 is similarly used for training a neural network to detect a crack or hole in images. The method 200 broadly comprises:

transforming images by:
Step 202: detecting a hole in each training image of a plurality of training images; and
Step 204: transforming each training image into a transformed image, to suppress non-crack information in the training image; and
Step 206: training a neural network using the transformed images.

As step 202, a method for generating image patches is first conducted. Step 204 then involves converting each image into a near-binary image. In some embodiments, each patch is transformed into near-binary image patches by image filtering and segmentation.

Image filtering conducted at step 204 may comprise, for each training image, applying a set of filters. The set of filters is designed to enhance image features based on a shape of each said feature. The image features are then used to enhance tubular or vessel-like structures. For instance, Hessian based filters can be used to enhance thin vessel-like structures. Such filters employ the analysis of second order derivatives of image intensity, which is encoded in a Hessian matrix. The core of each Hessian based filter is an enhancement function, a mathematical expression involving the eigenvalues of the Hessian matrix, based on which the response of the filter is computed. Hessian based filters aim to indicate or identify elongate structures by the enhancement function of Hessian eigenvalues. However, the response of Hessian based filters may exhibit various deficiencies such as variation of eigenvalues with image intensity and non-uniformity of enhancement across scales.

Applying a set of filters may therefore instead, or in addition, include applying a vessel enhancing filter. One such example for use in present methods is Jerman's 2D vesselness filter that is applied to each training image to enhance crack information in the training image—it may similarly be applied to new images after training. Jerman's 2D vesselness filters are used to overcome the aforementioned challenges faced by the Hessian based filters. For completeness, to define Jerman's 2D filter we let $\lambda_i$, i=1,2,3 denote the Hessian eigenvalues of an image at each coordinate x. Considering the ideal eigenvalues' relationship $\lambda_2 \approx \lambda_3 \wedge |\lambda_{2,3}| \gg |\lambda_1|$ in vasculature—being the origin of the term "vessel" in "vesselness", which itself is intended to suggest the degree to which features represent a vessel of the vasculature—a Hessian eigenvalues function can be constructed to improve the enhancement performance using two-step piecewise compensation. In the present scenarios, it may be assumed that cracks have appearance features (i.e. features identifiable in images) that resemble vessels of the vasculature. Thus, vesselness filters may be understood to similarly refer to the degree to which particular image features represent a crack.

In some scenarios, the magnitudes of $\lambda_2$ and $\lambda_3$ may be lower at the vascular boundary or in the low-scale vessel ($|\lambda_3| \geq |\lambda_2| \approx |\lambda_1| \rightarrow$Low). This does not match the ideal Hessian eigenvalues relationship in vasculature, resulting in significant attenuation of the vesselness response. A piecewise compensation on the eigenvalue $\lambda_3$ can be accordingly performed as:

$$\lambda_\rho = \begin{cases} \lambda_3 & \text{if } \lambda_3 < \tau \min_x \lambda_3(x, s), \\ \tau \min_x \lambda_3(x, s) & \text{otherwise,} \end{cases}$$

where $\sigma$ is the vessel scale and r is a threshold between 0 and 1. In addition, traditional vesselness filters would suppress blob-like structures and obtain poor response at vascular nodes ($|\lambda_1| \approx |\lambda_2| \approx |\lambda_3| \rightarrow$High). Blob-like structures in the present context may include holes and the like. Thus, compensation can be applied to the ellipsoid structure conforming to the condition $\lambda_2 \geq \lambda_\rho/2 > 0$ to construct the final vesselness function according to:

$$v_P = \begin{cases} 0 & \text{if } \lambda_2 > 0 \wedge \lambda_3 > 0, \\ 1 & \text{if } \lambda_2 \leq \lambda_\rho/2, \\ \lambda_2^2 (\lambda_\rho - \lambda_2) \left( \dfrac{3}{\lambda_2 + \lambda_\rho} \right)^3 & \text{otherwise.} \end{cases}$$

Jerman's 2D vesselness filters are based on the ratio of multiscale Hessian eigenvalues. In the present disclosure, l is used to denote the normalized lightness channel of the input image, i.e., its values lie in [0, 1]. With l as input, Gaussian smoothing can be firstly performed with standard deviation, which is equal to 1.5. A number of filter responses can then be obtained. In the present example, two filter responses of the smoothed image are obtained.

The two filter (i.e. P=2) responses include $V_1$ for dark cracks on bright background, and $V_2$ for bright cracks on dark background. The vessel scale $\sigma$ is set to be from 0.5 to 2 with a step size of 0.5. It will be appreciated that other ranges may be used depending on the features sought to be identified, lighting and other factors. Decreasing r generally increases $\lambda_\rho$, since there is a higher likelihood that $\lambda_2 > \lambda_\rho/2$, for which $V_P$ is set to 1. The consequence of this is, in general, a more uniform response on bright cracks for $\tau < 1$. In some embodiments, the cutoff threshold r is set to be 1 for controlling response uniformity.

Applying the set of filters may further comprise applying a multi-scale line filter to the image to enhance crack information in the training image. The basic idea of the multi-scale line filter is that line detection at varying scales can be achieved by simply changing the length and orientation of a basic line filter. The multi-scale line filter is based on a combination of the eigenvalues of the Hessian matrix. The resultant multi-scale line-filtered images provide significantly improved segmentation and visualization of curvilinear structures. For better robustness, said multi-scale line filter is exploited with the inverse image (i.e., 1-l) as input. Based on the prior statistics of crack length, scales are arranged from a minimum number of pixels (presently 5 pixels) to a maximum number of pixels (presently 11 pixels), with a step size that moves from the minimum to the maximum in a whole number of steps (presently 2 pixels). The combined multi-scale line filter response, denoted by R, is thus obtained by linearly combining the line filter responses at selected scales.

For each training image, step 202 may also comprise segmenting the training image to produce a segmentation mask. Image segmentation is used to figure out which pixels of the image belong to which objects when there is more than one object in view in a scene at the same time. It is a process of partitioning a digital image into multiple segments (i.e. sets of pixels, also known as image objects). The main aim of image segmentation is to segment the meaningful regions of interest for processing. In some examples, image segmentation may include assigning a label to every pixel in an image such that pixels with the same label share certain characteristics, such as color, intensity, or texture. In this case, it may be that each identified pixel either is considered to represent a hole pixel, or a not-hole pixel.

In some examples, the corresponding result of image segmentation may be a set of contours extracted from the image. Contours herein refer to boundaries designed for the area of interest required in an image. Indeed, image segmenting may comprise performing active contour-based segmentation of the hole in the image. Active contour can be described as active model for the process of segmentation, and is a defined model for segmentation of pixels from the required region of interest for which processing is performed to obtain the outcome for research. In particular, active contouring is used in present methods to produce a pixelwise segmentation mask for each object. This technique is applied for separation of foreground from the background. The segmented region of interest undergoes further image analysis, and defines a separate boundary or curvature for the regions of target object for segmentation. It is also defined as the use of energy forces and constraints for segregation of the pixels of interest from the image for further processing and analysis. This can dramatically increase accuracy of the training process, while also reducing computational load by avoiding lengthy processing of every pixel or kernel.

Figure 4:
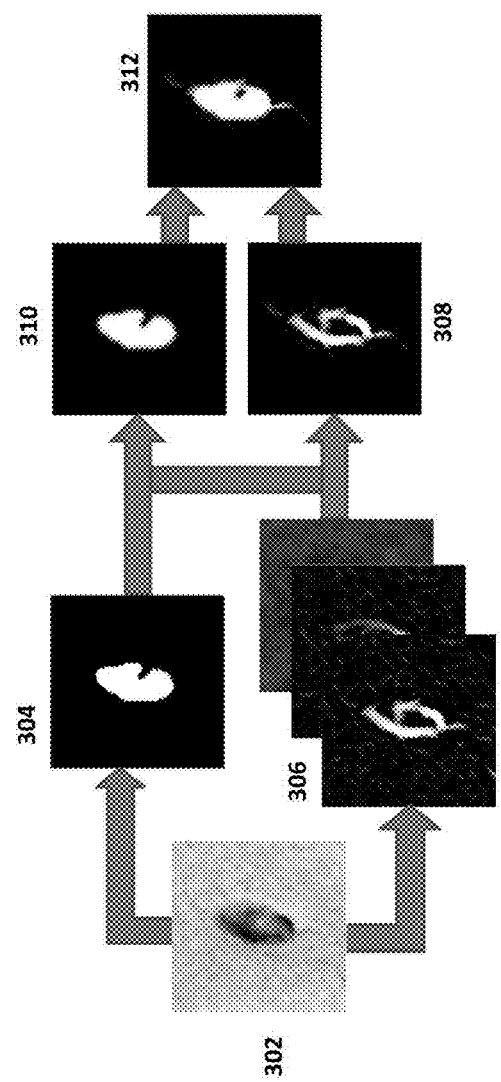
FIG. 4 is a flow diagram showing a method used for patch transformation for converting each raw image patch into near-binary patches.
Figure 5D:
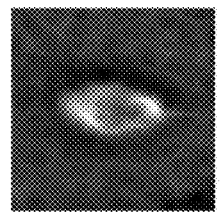
FIG. 5 is a series of diagrams (FIGS. 5A-5H) showing example filter responses and the resulting near-binary patch.
Figure 5C:
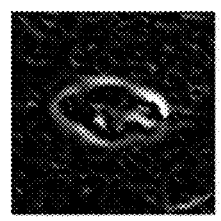
Figure 5B:
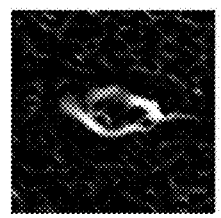
Figure 5A:
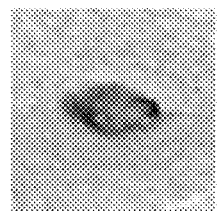
Figure 5H:
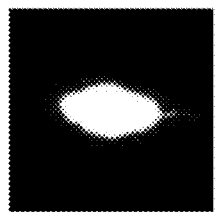
Figure 5G:
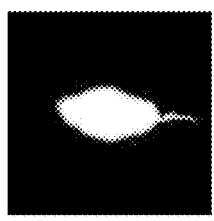
Figure 5F:
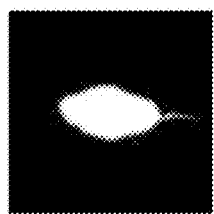
Figure 5E:
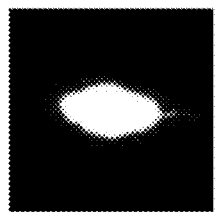

FIG. 4 illustrates an example workflow 300 of patch transformation at step 202/204 for converting each raw image patch into transformed images (i.e. near-binary patches). In pre-processing, all holes in each image are detected. An image patch is then created for each hole. For each image patch, the hole is placed at the centre. Moreover, each patch contains only one hole. Thus, for each detected hole, a corresponding image patch is cropped, and segmentation/masking/active contour is applied to the cropped image patch.

The objective of generating image patches in a transformed space (i.e. near-binary image patches) is to enhance the hole and its associated crack (if any) and to suppress irrelevant information from the background at the same time. This objective is achieved by combining the segmentation mask of the holes with responses of the set of filters. For each patch 302, active contour based segmentation of the detected hole is performed first at the center of the holes in the image. After segmenting the training image, the Jerman's 2D vesselness filter and multi-scale line filter may be further used for the enhancement of crack information in the training image.

Based on the resulting segmentation mask 304 and the filter responses 306, the next step is to identify a surrounding region in which the enhanced response for cracks should be retained based on the segmentation mask and the responses from the set of filters. In some embodiments, transforming each training image comprises applying a filter to the surrounding region to enhance crack features to produce a filter response 308 as well as applying Gaussian blur to the surrounding region to produce a Gaussian blurred segmentation mask 310 of the hole. The filter response for a dark crack in the surrounding region and the Gaussian blurred segmentation mask of the hole can be combined by taking the maximum value of them, resulting in a near-binary image patch 312.

FIG. 5 illustrates example filter responses and the corresponding near-binary patch. In particular, FIG. 5A shows said normalized lightness channel/of the input image. FIG. 5B to 5D illustrates respectively the filter response $V_1$, $V_2$, and R of the image patch in FIG. 5A. As shown in FIG. 5E, by integrating the filter responses $V_1$, $V_2$, and R with the segmentation mask of the hole, a region of interest (ROI) mask can be obtained. Said region of interest (ROI) is an area of an image defined for further analysis or processing. In particular, the ROI mask indicates the region in which strong filter responses should be retained—e.g. a region containing filter responses that exceed a predetermined threshold. The resulting near-binary patch is then obtained by taking the maximum value the filter response and the Gaussian blurred segmentation mask inside ROI, as shown in FIG. 5F.

It will be appreciated that some alternative methods may be used to obtain the final near-binary patch. For example, the final near-binary patch can be obtained by performing non-linear filtering of the near-binary patch (see FIG. 5G). A non-linear filtering is one that cannot be done with convolution of Fourier multiplication. On the one hand, nonlinear filters offer definite advantages over linear filters in preserving the detailed structure of the signal and in suppressing long-tailed noise processes. On the other hand, nonlinear filters are considerably harder to use and design than linear ones, because the mathematical tools such as the impulse response and frequency response cannot be used on them. A nonlinear filter may also produce results that vary in a non-intuitive manner. The final near-binary patch can also be obtained by generating an RGB image patch instead by using the three filter responses $V_1$, $V_2$, and R (see FIG. 5H). Table I shows the comparison results of different patch generation methods in terms of precision, recall and F-score. Among the three methods, the proposed method based on near-binary patch was shown to achieve the highest F-score and recall. Results for methods illustrated in FIGS. 5G and 5H have shown that these alternative methods are inferior to the adopted one illustrated in FIG. 5B to 5E.

TABLE I

| | Precision | Recall | F-score |
|---|---|---|---|
| Near-binary patch (see FIG. 5F) | 84.0% | 86.9% | 85.4% |
| Nonlinear filtering (see FIG. 5G) | 86.4% | 83.6% | 85.0% |
| RGB patch (see FIG. 5H) | 83.5% | 81.1% | 82.3% |

Figure 6A:
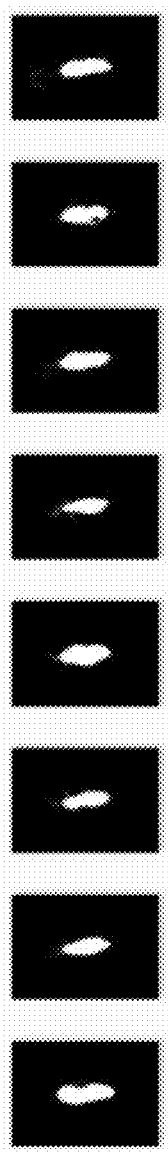
FIG. 6 is a series of diagrams (FIGS. 6A-6C) showing non-crack patches, crack patches enhanced by the filter response only, and crack patches enhanced with the ground truth cack mask.
Figure 6B:
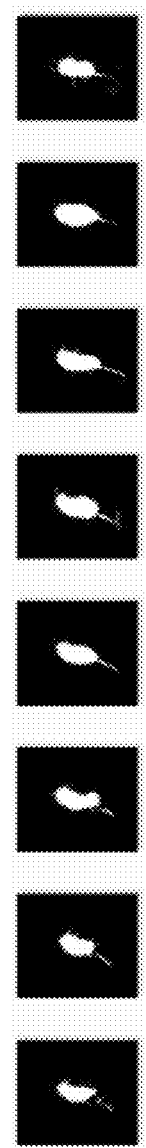
Figure 6C:
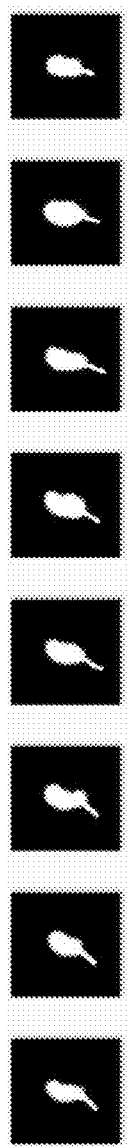

FIG. 6 illustrates three kinds of near-binary patches. In particular, FIG. 6A shows example filtered non-crack patches. As shown in FIGS. 6B and 6C, the method 200 may further comprise producing one or more further training images by combining a hole segmentation mask with a crack segmentation mask. To be specific, for training images and with the available ground truth mask for cracks, "crack" patches are enhanced by directly combining the hole segmentation mask with the crack mask. The above strategy has the ability to generate alternative sets of training image patches. In particular, FIG. 6B shows one kind of crack patches which are enhanced by the filter response. FIG. 6C illustrates another kinds of crack patches which are further enhanced with the ground truth (GT) crack mask. To train the cGAN to further enhance the crack, manually drawn ground truth masks for cracks may be overlaid on the filtered images to construct ground truth images. Compared to the crack patches in FIG. 6B, the cracks in GT images in FIG. 6C are thicker and more prominent, with even less background noise. As will be discussed later, the neural network trained at step 206 aims to have the ability to discriminate said crack and non-crack patches.

Despite the filtering and segmenting enhancement at step 202/204, the crack in the near-binary image patches may be still thin and weak. In some embodiments, thin and weak cracks may still be detected by reference to holes—e.g. by those cracks extending from holes. Moreover, cracks can be distinguished from more readily identifiable noise (e.g. discolouration or dirt that looks like a crack) by virtue of the association of those cracks with holes and the lack of association of the noise with holes.

One way to detect weak and thin cracks in image patches is using a neural network trained at step 206 using the transformed images so as to enhance defects and hence improve the detection rate. In some embodiments, the neural network consists of three components, including one generator and two discriminators. At step 206, the training set is constructed first by using the available training images generated at step 204. The neural network may take a pair of images, i.e. the filtered and GT images in both the generator and the discriminator networks. In some embodiments, the GT images may be associated with the training images.

The generator is designed to generate like-real patches to fool the adversarial discriminator and enhance the perceptual discriminator. During training, the generator learns to generate images that cannot be distinguished from real GT images by the adversarial discriminator. The first discriminator is an adversarial one for discriminating real GT images and generated images. The second discriminator is a perceptual discriminator incorporated in the framework used to discriminate crack/non-crack patches. In this regard, for each patch, representing either crack or non-crack, there is a GT image and a generated image. In the context of the training and testing phases, the terms "patch" and "image" may be used interchangeably. This is particularly the case where the patches contain only one hole.

Step 206 may comprise training a cGAN in the transformed space for patch-based crack detection. A cGAN is a type of generative adversarial network (GAN). GAN is a type of deep learning network that can generate data with similar characteristics as the input training data. A GAN consists of two networks that are trained together, including a generator and a discriminator. The generator of the GAN generates data with the same structure as the training data given a vector of random values as input. The generative model G learns to map input data z from noise distribution $p_z(z)$ to data x in data space: $G: z \to x$. Given batches of data containing observations from both the training data, and generated data from the generator, the discriminator attempts to classify the observations as "real" or "generated".

Figure 7:
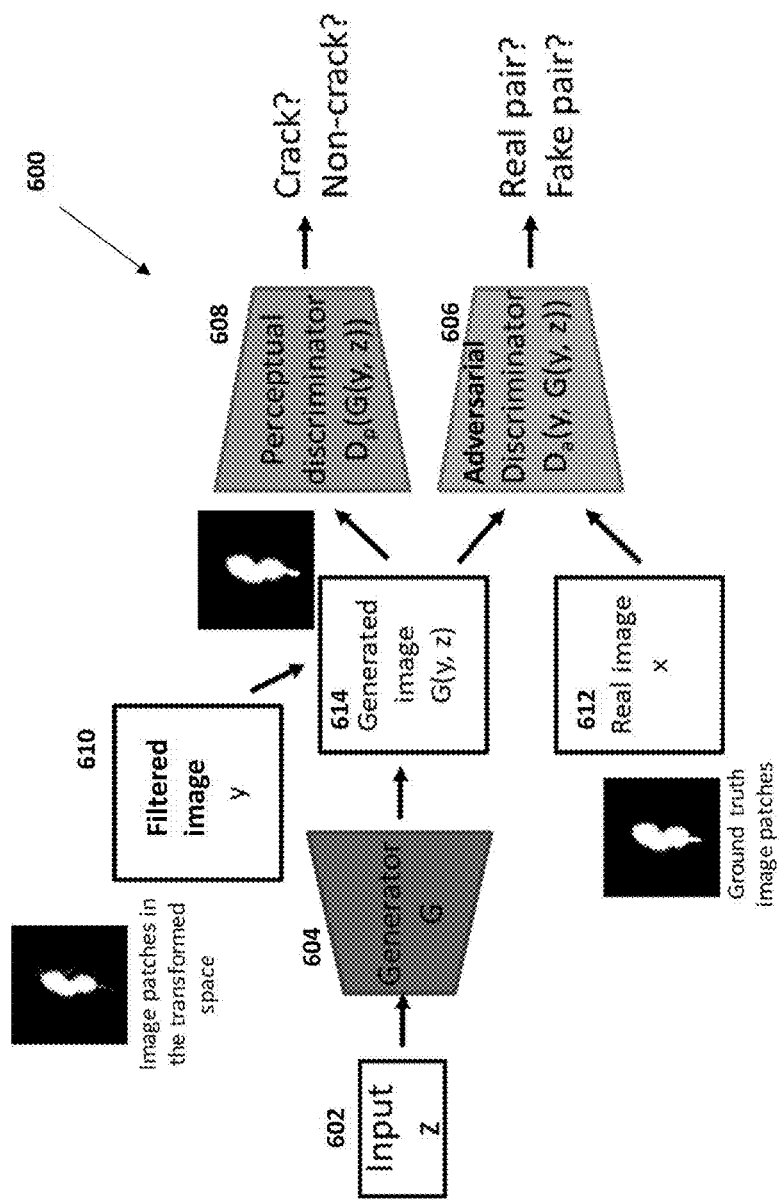
FIG. 7 is a diagram showing the structure of the proposed cGAN networks.

FIG. 7 shows an example structure of the proposed cGAN 600. Compared to traditional GAN, cGAN takes advantage of labels during the training process. That is, cGANs learn from an additional observation y: $G: \{y, z\} \to x$. Similar to GAN, given a label and random array as input data z 602, the generator 604 of cGAN generates with the same structure as the training data observations corresponding to the same label. Given batches of labeled data containing observations from both the training data and generated data from the generator 604, the adversarial discriminator 606 of the cGAN attempts to classify the observations as "real" or "generated". The perceptual discriminator network 608 is incorporated into the framework as a defect/non-defect classifier.

In the proposed cGAN setup, the neural network takes a pair of input images, filtered (i.e. y, see 610) and GT image (i.e. x, see 612), in both the generator and discriminator networks. Using pairs of images with ground truth labelling as input, the generator network is trained to generate images in which the defects become more apparent and the perceptual discriminator network is trained to classify defect images from normal images simultaneously. The adversarial discriminator network $D_a$ 606 outputs an estimated probability of the input belonging to the real GT image 612. These parameters are obtained by optimizing a loss function:

$$L_{dis\_a}(D_a) = -\log D_a(y,x) - \log(1 - D_a(y, G(y,z))).$$

The perceptual discriminator network $D_p$ 608 outputs an estimated probability p of the input containing a crack. During training stage, the perceptual discriminator network $D_p$ 608 is trained by GT images x to achieve high classification accuracy. The perceptual discrimination loss is defined by the loss of binary classification:

$$L_{dis\_p}(x) = -\log p_g(x) = -g \log p(x) - (1-g) \log(1-p(x))$$

where g indicates the ground truth class. The parameters of the generator network are obtained by optimizing a loss function that is the sum of the adversarial loss and the perceptual loss produced by the discriminator networks:

$$L_G(G) = L_a(G) + L_{dis\_p}(G)$$

where $$L_a(G) = -\log D_a(y, G(y,z)).$$

Figure 8:
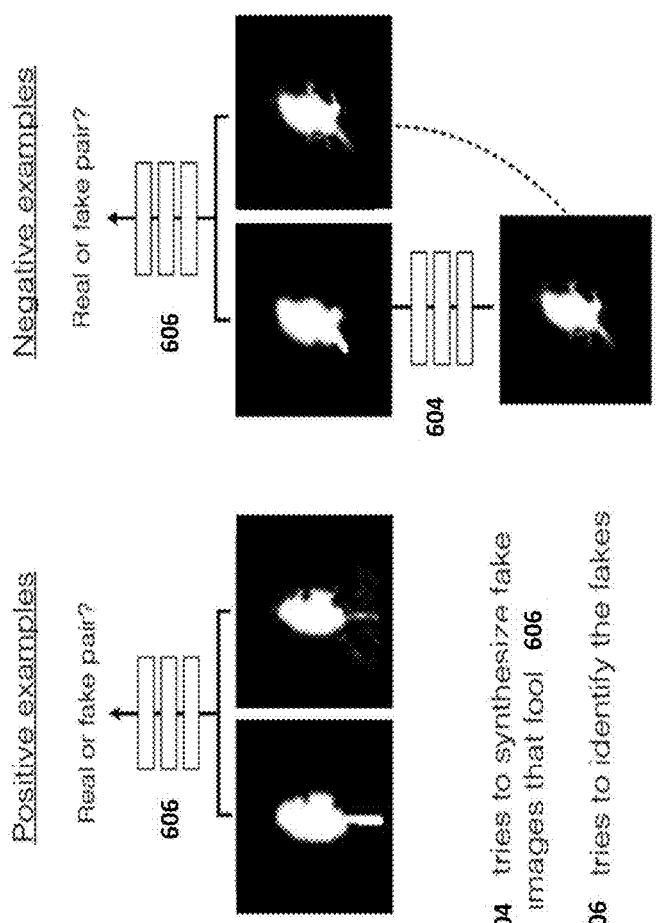
FIG. 8 is a diagram showing cGAN training for enhanced image patch generation.

FIG. 8 shows cGAN training for enhanced patch generation. The generator network 604 and the two discriminator networks 606, 608 are trained simultaneously so as to maximize the performance of them. To maximize the performance of the generator 604, the sum of the adversarial loss and the perceptual loss (i.e. $L_G(G)$) needs to be maximized when given generated labeled data. The target of the generator 604 is to generate labeled data that the adversarial discriminator 606 classifies as 'real', and to generate labeled data that the perceptual discriminator 608 classifies correctly as containing 'crack' or not containing 'crack'. To maximize the performance of the adversarial discriminator 606, the target is to minimize the loss of the adversarial discriminator when given batches of both real image 612 (i.e. x) and generated labeled data (i.e. G:{y, z}, see 614). As shown in FIG. 8, the objective of the adversarial discriminator 606 is to not be fooled by the generator 604. To maximize the performance of the perceptual discriminator 608, the target is to minimize the loss of the perceptual discriminator 608 when given batches of both filtered (i.e. y, see 610) and generated labeled data G: {y, z} 614. It will be appreciated that an ability of the perceptual discriminator 608 to discriminate between crack/non-crack patches increases as an ability of the adversarial discriminator 606 to discriminate between GT images and generated images decreases.

These above strategies result in a generator that generates convincingly realistic data that corresponds to the input labels and discriminators that has learned strong feature representations that are characteristic of the training data for each label. Thereby, the generator 604 is forced to produce images that can be classified more easily by the perceptual discriminator and that the adversarial discriminator finds more difficult to classify. This approach can be considered under the paradigm of transfer learning, that is, the neural network is trained on a first task is re-purposed on a second, related task. The intuition behind transfer learning is that if a model is trained on a large and general enough dataset, this model will effectively serve as a generic model. It is easy to take advantage of the learned feature maps without having to start from scratch by training a large model on a large dataset.

In some embodiments, the method 200 also includes a testing step 208 (see FIG. 3), which includes transforming the "new" or "further" training images into a similar space as that of the training set; and then fine tuning the trained models, if necessary. As mentioned before, said transformed space is used to facilitate transfer learning for crack detection, which addresses the challenges arising from weak signals due to the inherent shape characteristics of cracks, as well as large appearance variations caused by varying imaging conditions. In the testing stage, an image generated by the generator network is passed to both the adversarial discriminator network $D_a$ and the perceptual discriminator network Dn.

Embodiments of the proposed method 200 are further illustrated by reference to the following non-limiting experiment results.

Table I shows an example training and testing dataset. The process was repeated a number of times to obtain a mean score. The aforementioned method 200 was applied and validated on a dataset of images of turbine blades of aircraft engines containing over 2500 image patches of 256 by 256 pixels, where 80% of the whole dataset was selected randomly as a training set, and 20% as a testing set (see Table II).

TABLE II

|  | Crack | Non-crack | Total |
| --- | --- | --- | --- |
| Training | 698 | 1582 | 880 |
| Testing | 177 | 394 | 571 |

The quantitative evaluation is shown in Table III, which shows performance comparison on five detection methods. Crack detection accuracy was measured by precision, recall and F-score. The EfficientGAN is a semi-supervised anomaly detection method, that learns a feature representation from "normal" samples and identifies anomalies by identifying any deviations from this normal. In particular, 80% of the normal data (non-crack patches) is used as a training set. Regarding the detection method Orig+Class, the original image patch I is fed directly into a simple convolutional neutral network (CNN) for classification. The whole dataset is split into three-fold cross validation for training and testing. For Filter+Class, the filtered result $I_{filter}$ is fed directly into a simple convolutional neutral network (CNN) for classification. Similarly, the whole dataset is split into three-fold cross validation for training and testing. Regarding cGAN+Class, the original cGAN is used first to enhance the filtered images. For crack classification, the same CNN is trained by GT images and tested on the output images of cGAN. For the proposed cGAN, 80% of the whole dataset was randomly selected as a training set and 20% as a testing set. The process was repeated four times to get the average accuracy. The results have shown that the integrated perceptual discriminator is very effective in improving the crack detection accuracy.

TABLE III

|  | Precision | Recall | F-score |
| --- | --- | --- | --- |
| Orig + Class | 83.0% | 73.2% | 77.8% |
| Filter + Class | 84.0% | 86.9% | 85.4% |
| cGAN + Class | 75.9% | 86.8% | 81.0% |

TABLE III-continued

|  | Precision | Recall | F-score |
| --- | --- | --- | --- |
| EfficientGAN | 70.4% | 92.1% | 79.8% |
| Proposed cGAN | 100% | 96.8% | 98.4% |

Figure 9:
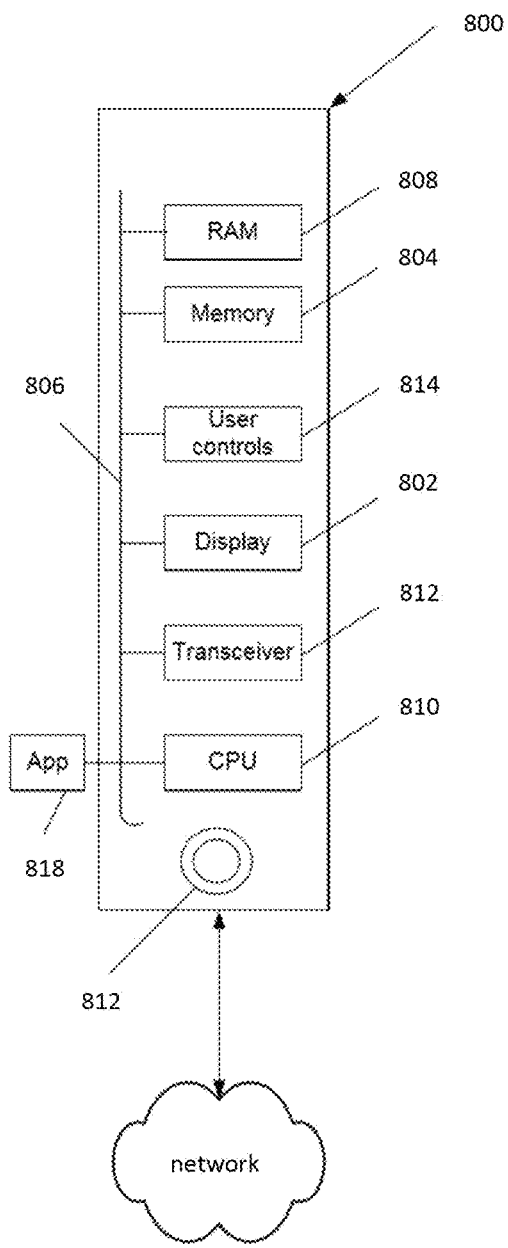
FIG. 9 is a schematic diagram showing components of an exemplary computer system for performing the methods described herein.

FIG. 9 is a block diagram showing an exemplary computer device 800, in which embodiments of the invention may be practiced. The computer device 800 may be a mobile computer device such as a smart phone, a wearable device, a palm-top computer, and multimedia Internet enabled cellular telephones, an on-board computing system or any other computing system, a mobile device such as an iPhone™ manufactured by Apple™, Inc or one manufactured by LG™, HTC™ and Samsung™, for example, or other device.

As shown, the mobile computer device 800 includes the following components in electronic communication via a bus 806:

(a) a display 802;
(b) non-volatile (non-transitory) memory 804;
(c) random access memory ("RAM") 808;
(d) N processing components 810;
(e) a transceiver component 812 that includes N transceivers; and
(f) user controls 814.

Although the components depicted in FIG. 9 represent physical components, FIG. 9 is not intended to be a hardware diagram. Thus, many of the components depicted in FIG. 9 may be realized by common constructs or distributed among additional physical components. Moreover, it is certainly contemplated that other existing and yet-to-be developed physical components and architectures may be utilized to implement the functional components described with reference to FIG. 9.

The display 802 generally operates to provide a presentation of content to a user, and may be realized by any of a variety of displays (e.g., CRT, LCD, HDMI, micro-projector and OLED displays).

In general, the non-volatile data storage 804 (also referred to as non-volatile memory) functions to store (e.g., persistently store) data and executable code. The system architecture may be implemented in memory 804, or by instructions stored in memory 804.

In some embodiments for example, the non-volatile memory 804 includes bootloader code, modem software, operating system code, file system code, and code to facilitate the implementation components, well known to those of ordinary skill in the art, which are not depicted nor described for simplicity.

In many implementations, the non-volatile memory 804 is realized by flash memory (e.g., NAND or ONENAND memory), but it is certainly contemplated that other memory types may be utilized as well. Although it may be possible to execute the code from the non-volatile memory 804, the executable code in the non-volatile memory 804 is typically loaded into RAM 808 and executed by one or more of the N processing components 810.

The N processing components 810 in connection with RAM 808 generally operate to execute the instructions stored in non-volatile memory 804. As one of ordinary skill in the art will appreciate, the N processing components 810 may include a video processor, modem processor, DSP, graphics processing unit (GPU), and other processing components.

The transceiver component 812 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The system 800 of FIG. 9 may be connected to any appliance 818, such as one or more cameras mounted to the vehicle, a speedometer, a weather service for updating local context, or an external database from which context can be acquired.

It should be recognized that FIG. 9 is merely exemplary and in one or more exemplary embodiments, the functions described herein may be implemented in hardware, software, firmware, or any combination thereof. If implemented in software, the functions may be stored on or transmitted over as one or more instructions or code encoded on a non-transitory computer-readable medium 804. Non-transitory computer-readable medium 804 includes both computer storage medium and communication medium including any medium that facilitates transfer of a computer program from one place to another. A storage medium may be any available medium that can be accessed by a computer.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The invention claimed is:

1. A method for training a neural network, comprising:
transforming each training image of a plurality of training images by, for each training image:
detecting a hole in the training image; and
transforming the training image into a transformed image, to suppress non-crack information; and
training a neural network using the transformed images, to detect cracks in images,
wherein transforming each training image further comprises, for each training image:
applying a set of filters, the set of filters being designed to enhance image features based on a shape of each said feature, segmenting the training image to produce a segmentation mask, and combining the segmentation mask with responses from the set of filters;
identifying, based on the segmentation mask and the responses from the set of filters, a surrounding region; and
applying a filter to the surrounding region to enhance crack features to produce a filter response, applying Gaussian blur to the surrounding region to produce a Gaussian blurred segmentation mask of the hole, and attributing to the transformed image a maximum of the filter response and Gaussian blurred segmentation mask.

2. The method of claim 1, further comprising:
receiving at least one further image; and
applying the trained neural network to the at least one further image, to detect cracks in the at least one further image.

3. The method of claim 1, wherein segmenting comprises performing active contour-based segmentation of the hole in the image.

4. The method of claim 1, wherein applying the set of filters comprises applying Jerman's 2D vesselness filter and a multi-scale line filter to the image to enhance crack information in the training image.

5. The method of claim 1, wherein transforming each training image into a transformed image, to suppress non-crack information in the training image, comprises detecting crack features by reference to the hole detected in the respective training image.

6. The method of claim 5, wherein a plurality of the training images form a series of temporally spaced images of a common object, and detecting crack features by reference to the hole detected in the respective training image comprises comparing crack features detected in a first image in the series with crack features detected in a second image in the series to determine crack progression.

7. The method of claim 6, wherein each image comprises an object, the method further comprising:
receiving a further image of an object;
applying the trained neural network to the further image, to detect crack features in the further image; and
comparing the crack features in the further image to crack features in a temporally previous image of the object of the further image to determine crack progression.

8. The method of claim 1, wherein transforming each training image into a transformed image, to suppress non-crack information in the training image, comprises disregarding crack features that are not associated with a hole detected in the respective training image.

9. The method of claim 1, further comprising producing one or more further training images by combining the Gaussian blurred segmentation mask with a ground truth mask corresponding to a crack.

10. The method of claim 1, wherein training the neural network comprises training a conditional generative adversarial network (cGAN) using the transformed images to detect cracks, the cGAN comprising an adversarial discriminator for distinguishing between real ground-truth (GT) images and generated images, and a generator for generating the generated images.

11. The method of claim 10, comprising incorporating a perceptual discriminator into the cGAN such that an ability of the perceptual discriminator to discriminate between GT images and generated images increases as an ability of the adversarial discriminator to discriminate between GT images and generated images decreases.

12. The method of claim 11, wherein the perceptual discriminator outputs an estimated probability p of the training image containing a crack, wherein a perceptual discrimination loss is defined a loss of binary classification according to:

$$L_{disp}(x) = -\log p_g(x) = -g \log g\, p(x) - (1-g)\log(1-\mathbb{[}p(x))$$

where g indicates a ground-truth class.

13. The method of claim 11, wherein parameters of the generator are obtained by optimizing a loss function being a sum of an adversarial loss and a perceptual loss produced by the adversarial discriminator and perceptual discriminator, according to:

$$L_G(G)=L_a(G)+L_{dis_p}(G)$$

where $$L_a(G)-\log D_a(y,G(y,z)).$$

14. A system for training a neural network, comprising:
memory; and
at least one processor, the memory storing instructions that, when executed by the at least one processor, cause the at least one processor to:
  transform each training image of a plurality of training images, for each training image, by:
    applying a set of filters, the set of filters being designed to enhance image features based on a shape of each said feature, segmenting the training image to produce a segmentation mask, and combining the segmentation mask with responses from the set of filters:
    detecting a hole in the training image;
    transforming the training image into a transformed image, to suppress non-crack information;
    identifying, based on the segmentation mask and the responses from the set of filters, a surrounding region; and
    applying a filter to the surrounding region to enhance crack features to produce a filter response, applying Gaussian blur to the surrounding region to produce a Gaussian blurred segmentation mask of the hole, and attributing to the transformed image a maximum of the filter response and Gaussian blurred segmentation mask; and
  train a neural network using the transformed images, to detect cracks in images.

15. The system of claim 14, wherein the at least one processor is configured to perform the method of claim 1.

16. The system of claim 15, wherein the at least one processor transforms each training image into a transformed image, to suppress non-crack information in the training image, by detecting crack features by reference to the hole detected in the respective training image.

17. The system of claim 16, wherein either:
  the at least one processor is further configured to:
    receive at least one further image; and
    apply the trained neural network to the at least one further image, to detect cracks in the at least one further image,
  wherein transforming each training image into a transformed image, to suppress non-crack information in the training image, comprises detecting crack features by reference to the hole detected in the respective training image; or
  a plurality of the training images form a series of temporally spaced images of a common object, and the at least one processor is configured to detect crack features by reference to the hole detected in the respective training image by comparing crack features detected in a first image in the series with crack features detected in a second image in the series to determine progression of a crack, and wherein each image comprises an object, the at least one processor being further configured to:
  receive a further image of an object;
  apply the trained neural network to the further image, to detect crack features in the further image; and
  compare the crack features in the further image to crack features in a temporally previous image of the object of the further image to determine crack progression.

* * * * *